(12) United States Patent
Sui et al.

(10) Patent No.: US 8,598,252 B2
(45) Date of Patent: Dec. 3, 2013

(54) COMPRESSIBLE AND HIGHLY FLEXIBLE PLUGGING AGENT

(75) Inventors: Yuehua Sui, Shandong (CN); Fang Guan, Shandong (CN); Aizhao Zhou, Shandong (CN); Xiaoping Zhao, Shandong (CN); Shuai Zhang, Shandong (CN); Genyu Cui, Shandong (CN); Yuanqiang Cui, Shandong (CN); Yongquan Sui, Shandong (CN); Shuwei Wang, Shandong (CN); Lei Ge, Shandong (CN); Zhanfu Chi, Shandong (CN); Chunyu Wang, Shandong (CN); Zhijie Liu, Shandong (CN)

(73) Assignee: Dongying Taier Petrol Technology Co., Ltd., Shida Scientific Park, Dongying District, Dongying, Shandong (CN)

( * ) Notice: Subject to any disclaimer, the term of this patent is extended or adjusted under 35 U.S.C. 154(b) by 240 days.

(21) Appl. No.: 13/129,576

(22) PCT Filed: Apr. 26, 2010

(86) PCT No.: PCT/CN2010/000573
§ 371 (c)(1),
(2), (4) Date: May 16, 2011

(87) PCT Pub. No.: WO2010/145189
PCT Pub. Date: Dec. 23, 2010

(65) Prior Publication Data
US 2011/0230592 A1 Sep. 22, 2011

(30) Foreign Application Priority Data
Jun. 18, 2009 (CN) .......................... 2009 1 0016064

(51) Int. Cl.
| | | |
|---|---|---|
| *C09K 8/00* | (2006.01) | |
| *B22F 1/00* | (2006.01) | |
| *C08K 3/10* | (2006.01) | |
| *C08K 3/22* | (2006.01) | |
| *C08L 89/00* | (2006.01) | |
| *C08L 39/00* | (2006.01) | |
| *C08L 67/00* | (2006.01) | |
| *C08L 73/00* | (2006.01) | |
| *C08L 77/00* | (2006.01) | |
| *C04B 26/04* | (2006.01) | |
| *C08F 8/30* | (2006.01) | |

(52) U.S. Cl.
USPC ............... 523/130; 524/1; 524/436; 524/498; 524/499; 524/500; 524/539; 524/555; 524/599; 524/606; 524/612

(58) Field of Classification Search
USPC .......................................... 523/130
See application file for complete search history.

(56) References Cited

U.S. PATENT DOCUMENTS

| | | | | |
|---|---|---|---|---|
| 4,192,753 A | * | 3/1980 | Pye et al. ...................... | 507/103 |
| 6,555,507 B2 | * | 4/2003 | Chatterji et al. .............. | 507/219 |
| 2005/0187113 A1 | * | 8/2005 | Hayes ........................... | 507/119 |
| 2006/0116294 A1 | * | 6/2006 | Xiang et al. .................. | 507/117 |
| 2006/0122071 A1 | * | 6/2006 | Reddy et al. ................. | 507/219 |

FOREIGN PATENT DOCUMENTS

WO PCT/CN2010/000573 8/2010

* cited by examiner

*Primary Examiner* — Peter F Godenschwager
*Assistant Examiner* — David Karst
(74) *Attorney, Agent, or Firm* — Global IP Services; Tianhua Gu

(57) ABSTRACT

A compressible and highly flexible plugging agent comprises the following components in parts by weight: 70-80 parts of natural rubber, 0.5-1 part of polyacrylamide (PAM), 1.5-3 parts of polyanionic cellulose (PAC), 0.5-1 part of biopolymer XC and 10-15 parts of ultrafine calcium carbonate; and the preparation method thereof comprises the following steps: adding the components in the weight parts into the natural rubber in order according to the common preparing method at normal temperature and pressure, mixing and stirring evenly, drying and then grinding into particles of 0.05-50 mm. The plugging agent is characterized by wide raw material sources, simple process, safe application, high plugging ratio and high compressibility, which is suitable for oil recovering and geological drilling applications.

2 Claims, No Drawings

COMPRESSIBLE AND HIGHLY FLEXIBLE PLUGGING AGENT

CROSS REFERENCE TO RELATED PATENT APPLICATION

The present application is the US national stage of PCT/CN2010/000573 filed on Apr. 26, 2010, which claims the priority of the Chinese patent application No. 200910016064.X filed on Jun. 18, 2009, which application is incorporated herein by reference.

FIELD OF THE INVENTION

The invention relates to a plugging agent for drilling, in particular to a compressible and highly flexible plugging agent.

BACKGROUND OF THE INVENTION

The normal plugging agents used for drilling in oil extraction are made of walnut shell, shell power, mica sheet and husk and have made great contribution to oil extraction. However, following shortcomings exist. (1) The effect is bad. (2) Large quantity of plugging material and long operation time are required. (3) Such agent will seriously damage pump parts, causing complex drilling troubles. (4) Such combination is only capable of permeable leakage caused by small and medium-sized cracks and porous formations but incapable of large scale leakage. (5) The walnut shell of large rigidness and no elasticity easily gathers at the entrance of the leaking pipe other than letting large granules get into the pipe deeply, thus it only seals the pipe tentatively and will cause repeat leakage latter, leading to major economic loss and greatly impacting on the plugging effect and drilling project.

SUMMARY OF THE INVENTION

The invention aims at providing a compressible and highly flexible plugging agent which is formed by combination of substrates of irregular shapes, good flexibility, resilience and elastic change capacity under pressure. Such agent can efficiently avoid or overcome aforesaid shortcomings, improve plugging effect, shorten drilling period and increase drilling speed.

The compressible and highly flexible plugging agent comprises following components in portions in weight: 70-80 portions of natural rubber, 0.5-1 portion of polyacrylamide, 1.5-3 portions of polyanionic cellulose (PAC), 0.5-1 portion of biopolymer (model XC, made by Sunda Cellulose Manufacture Company in Sunli Oil Field, China) and 10-15 portions of ultrafine calcium carbonate. The preparation method comprises the following steps: adding the components in the weight portions into the natural rubber in order according to the common preparing method at normal temperature (20° to 25° C.) and normal pressure (one atmospheric pressure), mixing and stirring them evenly, drying and then grinding the mixture into particles of 0.05-50 mm.

The natural rubber means concentrated latex-like rubber.

Compared with current bridging agents, the invention is characterized by the following advantages.
1. The agent has good flexibility and resilience, can easily get into throat of the leaking hole for bridging when being pumped.
2. The agent can get into the leaking pipe deeply due to good compressibility, thus providing better plugging effect.
3. The agent can be easily embedded into cracks due to its irregular deformation capacity, thus providing better plugging effect and loading capacity.
4. The granules of different shapes and diameters are especially suitable for karst type leakage of hard formation involving small, medium-sized and large cracks, which means the application range is wide.
5. The agent has good flexibility, can deform at a certain temperature and under a certain pressure, thus the bridging speed is fast and plugging effect is good. It prevents further damage caused by leakage, is harmless to the valve components and suitable for continuous operation.
6. The agent is nontoxic, environment friendly and safe in operation and will not cause complex drilling trouble.

DETAILED DESCRIPTIONS OF THE INVENTION

The compressible and highly flexible plugging agent comprises the following components in portions by weight: 70-80 portions of natural rubber, 0.5-1 portion of polyacrylamide (PAM), 1.5-3 portions of polyanionic cellulose (PAC), 0.5-1 portion of biopolymer XC and 10-15 portions of ultrafine calcium carbonate.

The preparation method comprises following steps: adding the components in the weight portions into the natural rubber in order according to the common preparing method at normal temperature and pressure, mixing and stirring them evenly, drying naturally and then grinding the mixture into particles of 0.05-50 mm.

The natural rubber means concentrated latex-like rubber. The plugging agent accounts for 2-15% in drilling fluid. The embodiments are described below.

Embodiment 1

Take 70 portions of natural rubber, 0.5 portion of polyacrylamide (PAM), 1.5 portions of polyanionic cellulose (PAC), 0.5 portion of biopolymer XC and 10 portions of ultrafine calcium carbonate, add them into the concentrated latex-like rubber in order according to the common preparing method at normal temperature and pressure, mix and stir them evenly, dry naturally and then grind the mixture into particles of 0.05 mm, and add compressible and highly flexible plugging agent accounting for 2% in the drilling fluid when using.

Embodiment 2

Take 74 portions of natural rubber, 0.75 portion of polyacrylamide (PAM), 2 portions of polyanionic cellulose (PAC), 0.7 portion of biopolymer XC and 12 portions of ultrafine calcium carbonate, add them into the concentrated latex-like rubber in order according to the common preparing method at normal temperature and pressure, mix and stir them evenly, dry naturally and then grind the mixture into particles of 15 mm, and add compressible and highly flexible plugging agent accounting for 8% in the drilling fluid when using.

Embodiment 3

Take 77 portions of natural rubber, 0.9 portion of polyacrylamide (PAM), 2.5 portions of polyanionic cellulose (PAC), 0.9 portion of biopolymer XC and 14 portions of ultrafine calcium carbonate, add them into the concentrated latex-like rubber in order according to the common preparing method at normal temperature and pressure, mix and stir them evenly, dry naturally and then grind the mixture into particles of 50 mm, and add compressible and highly flexible plugging agent accounting for 12% in the drilling fluid when using.

Embodiment 4

Take 80 portions of natural rubber, 1 portion of polyacrylamide (PAM), 3 portions of polyanionic cellulose (PAC), 1 portion of biopolymer XC and 15 portions of ultrafine calcium carbonate, add them into the concentrated latex-like rubber in order according to the common preparing method at normal temperature and pressure, mix and stir them evenly, dry naturally and then grind the mixture into particles of 25 mm, and add compressible and highly flexible plugging agent accounting for 15% in the drilling fluid when using.

Above embodiments shows excellent performance of the agent during drilling.

What is claimed is:

1. A method for preparing a highly flexible plugging agent comprising the following steps:
    adding 0.5-1 portion by weight of polyacrylamide (PAM), 1.5-3 portions by weight of polyanionic cellulose (PAC), 0.5-1 portion by weight of biopolymer and 10-15 portions by weight of ultrafine calcium carbonate into 70-80 portions by weight of natural rubber in the order as recited;
    mixing and stirring the polyacrylamide (PAM), polyanionic cellulose (PAC), biopolymer, ultrafine calcium carbonate with natural rubber evenly at 20°-25° C. in one atmosphere pressure;
    drying the mixture thereof; and
    grinding the mixture thereof into particles of 0.05-50 mm.

2. The method for preparing a highly flexible plugging agent of claim 1, wherein the natural rubber is concentrated latex-like rubber.

* * * * *